United States Patent
Smith et al.

(10) Patent No.: US 12,185,133 B1
(45) Date of Patent: Dec. 31, 2024

(54) SYSTEMS AND METHODS FOR DETECTING EVENTS IN A MESH NETWORK

(71) Applicant: United Services Automobile Association (USAA), San Antonio, TX (US)

(72) Inventors: Arthur Quentin Smith, Fredericksburg, TX (US); Oscar Guerra, San Antonio, TX (US); Timothy Blair Chalmers, San Antonio, TX (US); Noe Alberto Martinez, San Antonio, TX (US); Justin Dax Haslam, San Antonio, TX (US); Robert Lee Black, San Antonio, TX (US); Jon D. McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/113,661

(22) Filed: Feb. 24, 2023

Related U.S. Application Data

(60) Provisional application No. 63/314,187, filed on Feb. 25, 2022.

(51) Int. Cl.
  *H04W 24/02* (2009.01)
  *H04W 84/18* (2009.01)

(52) U.S. Cl.
  CPC ............ *H04W 24/02* (2013.01); *H04W 84/18* (2013.01)

(58) Field of Classification Search
  CPC .................................................... H04W 84/18
  See application file for complete search history.

(56) References Cited

U.S. PATENT DOCUMENTS

| | | | | |
|---|---|---|---|---|
| 2018/0247507 | A1* | 8/2018 | Emmanuel | G01S 5/0289 |
| 2020/0351607 | A1* | 11/2020 | Arngren | H04W 24/08 |
| 2023/0362581 | A1* | 11/2023 | Brooks | H04W 4/021 |

FOREIGN PATENT DOCUMENTS

| | | | | |
|---|---|---|---|---|
| GB | 2512543 | A * | 10/2014 | G06F 21/44 |
| GB | 2512781 | A * | 10/2014 | G06F 21/44 |

\* cited by examiner

*Primary Examiner* — Caroline H Jahnige
(74) *Attorney, Agent, or Firm* — Fletcher Yoder, PC

(57) ABSTRACT

Techniques provided herein employ a mesh network of wireless communication-enabled devices to monitor activity in a geographical area, such as a neighborhood or a parking lot. To this end, the mesh network monitoring system collects data about the devices found in the mesh network and establishes an expected activity level, which is used as a reference for comparing and classifying a current activity level. If the current activity level deviates significantly from the expected activity level, it may be classified as an unusual event. Upon detecting an unusual event, the mesh monitoring network may output a notification sent to the users of the devices in the mesh network. The mesh network monitoring system may help drivers determine availability of parking spots on a parking lot.

20 Claims, 4 Drawing Sheets

SYSTEMS AND METHODS FOR DETECTING EVENTS IN A MESH NETWORK

CROSS-REFERENCE TO RELATED APPLICATION

This application claims priority to and the benefit of U.S. Provisional Application No. 63/314,187, entitled "SYSTEMS AND METHODS FOR DETECTING EVENTS IN A MESH NETWORK" and filed on Feb. 25, 2022, the disclosure of which is incorporated by reference herein in its entirety for all purposes.

BACKGROUND

The present disclosure relates generally to systems and methods that use mesh networks to detect events (e.g., weather events, social events, unusual events) in a geographic area (e.g., a neighborhood, a parking lot).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication-enabled smart devices have become increasingly prevalent in various settings (e.g., residential homes, office buildings, cars). The wireless communication-enabled smart devices may wirelessly connect to each other to form mesh networks to efficiently and/or reliably communicate data.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a mesh network monitoring system includes one or more processors and memory storing instructions executable by the one or more processors to cause the one or more processors to obtain an expected activity level associated with a mesh network in a geographical area, receive data from multiple devices via the mesh network, and determine a current activity level associated with the mesh network based on the data. The instructions are executable by the one or more processors to cause the one or more processors to compare the current activity level to the expected activity level, detect an event based on a difference between the current activity level and the expected activity level, and provide an output indicative of the event.

In certain embodiments, a method of operating a mesh network monitoring system obtaining, using one or more processors, an expected activity level associated with a mesh network in a geographical area. The method also includes receiving, at the one or more processors, data from multiple devices via the mesh network. The method further includes determining, using the one or more processors, a current activity level associated with the mesh network based on the data. The method further includes comparing, using the one or more processors, the current activity level to the expected activity level. The method further includes detecting, using the one or more processors, an event based on a difference between the current activity level and the expected activity level. The method further includes providing, using the one or more processors, an output indicative of the event.

In certain embodiments, a mesh network monitoring system includes one or more processors and memory storing instructions executable by the one or more processors to cause the one or more processors to receive data from multiple wireless communication-enabled devices via the mesh network, determine current activity associated with the mesh network based on the data, detect an event based on the current activity, and provide an output indicative of the event to at least one of the multiple wireless communication-enabled devices.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure the articles "a," "an," "the," and "said" are intended to mean that there are one or more of the elements. The terms "comprising," "including," and "having" are intended to be inclusive and mean that there may be additional elements other than the listed elements. It should be noted that the terms "activity level" and "state" may be used interchangeably herein.

As wireless communication-enabled devices become increasingly common, using wireless mesh networks to monitor device activity over a geographic area becomes possible. The mesh networks may be used to detect certain activities, such as vehicles and people carrying wireless communication-enabled devices in a vicinity of one another (e.g., via cell phone tracking, tag tracking), and generate alerts based on changes from an expected activity level (e.g., a typical level of activity). For example, the mesh network of a neighborhood may detect people and vehicles that are not expected to be part of the mesh network and send a security alert in response to detection of possible suspicious activity. As another example, the mesh network of cars in a parking lot may be able to determine whether the parking lot is full or empty depending on the number of cars present in the mesh network.

Figure 1:
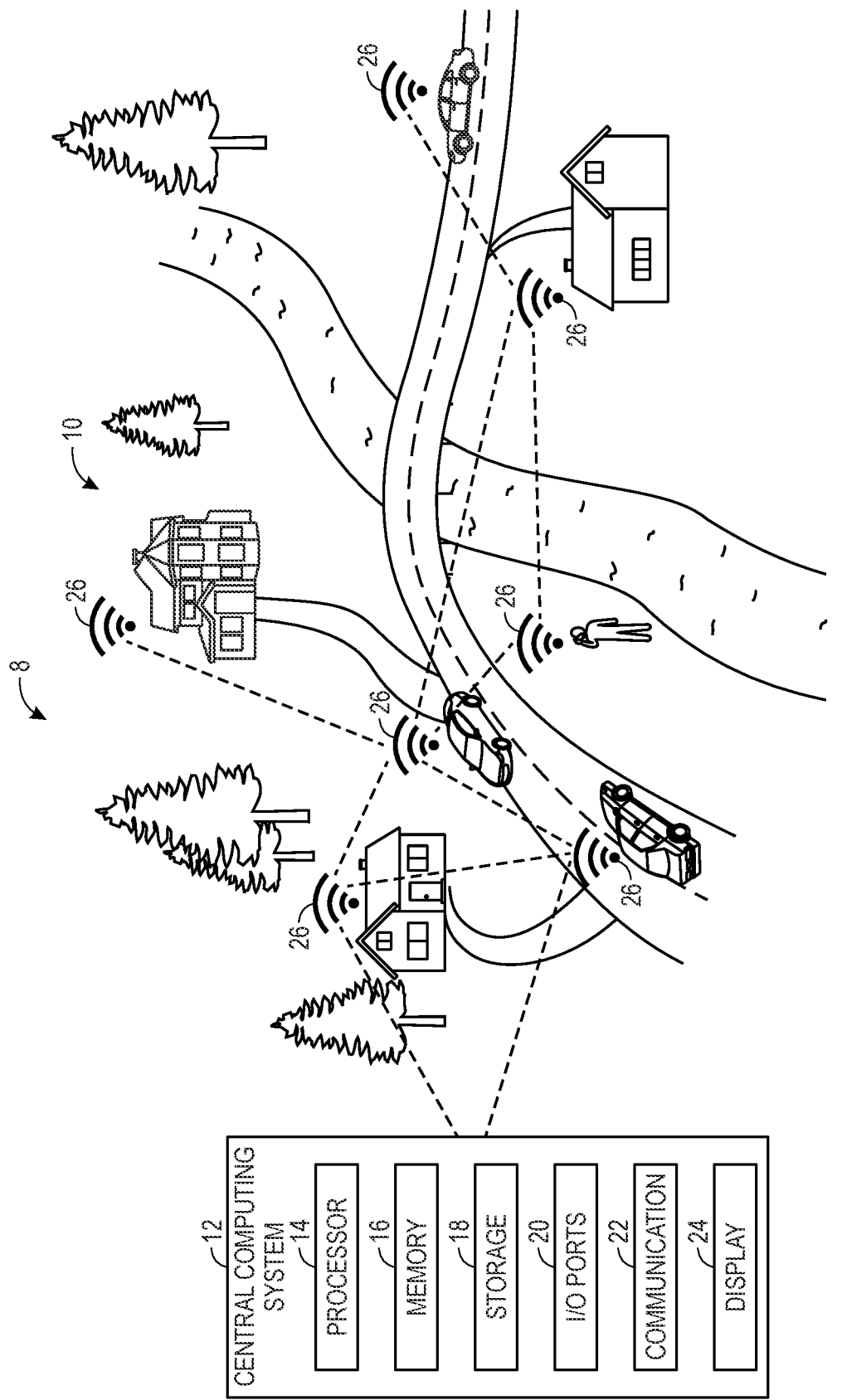
FIG. 1 illustrates a mesh network monitoring system of a neighborhood, in accordance with embodiments described herein.

With the foregoing in mind, FIG. 1 illustrates a mesh network monitoring system 8 of a neighborhood, in accordance with embodiments described herein. The mesh network monitoring system 8 includes a computing system 12, which may include any suitable computer device, such as a general-purpose personal computer, a laptop computer, a tablet computer, a mobile computer, or the like. The computing system 12 may include various types of components that assist the computing system 12 in performing various operations described herein. For example, the computing system 12 may include a processor 14, a memory 16, a storage 18, input/output (I/O) ports 20, a communication device 22 (e.g., computing system communication device), and/or a display 24.

The processor 14 may be any type of computer processor or microprocessor capable of executing computer-executable code. The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform various techniques disclosed herein. The memory 16 and the storage 18 may represent non-transitory computer-readable media (e.g., any suitable form of memory or storage). It should be noted that non-transitory merely indicates that the media is tangible and not a signal. Data (e.g., device information, current states, expected states) may be stored in one or more databases, which may be accessible to the computing system 12 and/or may be part of the computing system 12 (e.g., within the storage 18).

The I/O ports 20 may be interfaces that may couple to other peripheral components, such as input devices (e.g., keyboard, mouse). The display 24 may operate as a human machine interface (HMI) to depict visualizations associated with software or executable code being processed by the processor 14. In one embodiment, the display 24 may be a touch display capable of receiving inputs from a user of the computing system 12. The display 24 may be any suitable type of display, such as a liquid crystal display (LCD), plasma display, or an organic light emitting diode (OLED) display, for example. It should be noted that the components described above with regard to the computing system 12 are examples and the computing system 12 may include additional or fewer components. In some embodiments, the computing system 12 may be a distributed computing system that includes multiple processors 14 (e.g., including one or more cloud computing systems having multiple processors 14).

The computing system 12 is part of a mesh network 10 of devices 26, which is included in the mesh network monitoring system 8. The mesh network 10 may have a dynamic composition that changes as devices join or leave the network due to movement, power availability, firewall rules, and so forth. The devices 26 are wireless communication-enabled devices (e.g., Wi-Fi-enabled devices, Bluetooth-enabled devices, devices capable of transmitting radio frequency waves, wireless access point devices, routers). In addition, the mesh network 10 may include one or more wired components, such as wired radios. In some embodiments, the mesh network 10 of the devices 26 may include smart speakers, home security devices (e.g., smart security cameras, smart door locks and doorbells), cell phones/smartphones, Wi-Fi routers, Wi-Fi hotspots, car infotainment systems, tracker devices (e.g., tag trackers), smart sprinkler systems, toys, appliances, worn/carried devices, and/or any other wireless communication-enabled devices. As illustrated in FIG. 1, in a neighborhood-level mesh network monitoring system 8, the devices 26 may be associated with homes and/or vehicles (e.g., positioned inside homes and/or vehicles, including drones), and/or may be associated with pedestrians (e.g., carried by pedestrians), for example.

Regardless of its position and/or association, each device 26 in the mesh network 10 is connected to at least one other device 26, such that a communication signal (i.e., Wi-Fi signal, Bluetooth signal, radio-wave signal) emitted from one device 26 can reach another device 26. Such connectivity creates multiple routes for data to pass and allows two distant devices 26, which are outside their normal reach (e.g., direct reach) of each other's communication signal, to share data. Thus, as long as at least one device 26 in the mesh network 10 is connected to the computing system 12 and every device 26 is connected to at least one other device 26, data associated with each device 26 may be transmitted to the computing system 12 for storage and analysis.

The computing system 12 may be used to aggregate and process the data collected from devices 26 in the mesh network monitoring system 8. Processing the data may involve determining an activity level (e.g., a current or expected activity level) of the mesh network 10. The activity level may include information about the number of devices 26, movement of devices 26, area covered by devices 26, wireless signal traffic, retransmission activity, transition of devices 26 in or out of the mesh network 10, addition of new/unrecognized devices 26, and type of communications between devices 26 (e.g., data transmission versus handshakes). In one embodiment, where the mesh network monitoring system 8 spans over a neighborhood, the activity level for the neighborhood may be determined. As discussed in more detail herein, in one embodiment, where the mesh network monitoring system 8 spans over a parking lot, the activity level of the parking lot may be determined.

Different activity levels may exist at different times of a day, different days of a week, and special days (e.g., holidays). For example, the activity level in a neighborhood at 6:00 PM on a weekday may include increased car traffic as residents may be returning home from work. Thus, the mesh network monitoring system 8 may detect active and moving cars/car infotainment devices present on the mesh network 10. In particular, a car/car infotainment device becomes active after coming online (e.g., due to being turned on) and connecting to at least one other device 26 in the mesh network 10. The car/car infotainment device is detected as moving if its location changes and/or if it connects to new devices 26 due to coming into their signal range and disconnects from certain devices due to leaving their signal range. Meanwhile, the activity in the neighborhood at 8:00 AM may include increased foot traffic as the neighborhood residents walk their dogs. In this case, the mesh network monitoring system 8 may detect cell phones and tag trackers corresponding to pedestrians and their dogs moving around the neighborhood. Finally, during certain days such as holidays (e.g., Fourth of July), it is expected that the mesh network monitoring system 8 may detect unrecognized devices 26 (e.g., previously undetected cell phones, car infotainment systems) as friends and family visit the neighborhood residents for the holidays.

It should be appreciated that the activity level of the mesh network 10 may refer to either a current activity level (e.g., the activity level recorded at the current point in time) or an expected activity level (e.g., the typical activity level at a particular point in time). While the current activity level dynamically fluctuates, the expected activity level for a particular time can be determined based on dynamic patterns in the current activity levels, and can be represented as a single level of activity, or a range of activity reflecting the varying nature of mesh activity.

It should be appreciated that the mesh network 10 may be limited in terms of number and type of devices 26 that may be found in the mesh network 10. In addition, the area/space covered by the mesh network 10 may be limited. Factors that may be used to limit the size/reach of the mesh network 10 may include a maximum/minimum device density 26, distance between devices 26, restrictions for device entry into the mesh network 10, expulsion of certain types of devices 26, etc. In addition, devices with certain operating systems, security software level protocols, geographic locations and/or manufacturer-based limitations may be restricted from entry into the mesh network 10.

It should be appreciated that the geographic location covered by a mesh network 10 may cover a three-dimensional (3D) space and include devices 26 that are below and/or above ground. For example, the activity level of a mesh network 10 of aircraft at an airport may be monitored to predict the activity level of aircraft flying at an altitude over 1,000 ft. In another example, a helicopter activity level over a hospital may be predicted.

Establishing the expected activity level of the mesh network 10 covering a geographic location (e.g., a neighborhood) is a multi-step process. To establish the expected activity level, the computing system 12 may receive data indicative of the types of the devices 26 present in the mesh network 10, the locations (e.g., global positioning system [GPS] locations) of the devices 26, and identity information of the devices 26. For example, for each device 26 connected in the mesh network 10, the data received may include information that indicates whether the device 26 is a cell phone or a smart speaker, or some other type of device. Additionally, the data received may include the location of the device 26, which may include an absolute location in a global coordinate system (e.g., via a GPS sensor associated with the device 26) and/or a relative location in a local coordinate system (e.g., via communication with other device(s) 26). Additionally, the data received may include the identity information of the device 26, which may include an internet protocol (IP) address, model number, and/or system configuration information for the device 26. The received data may then be stored in the memory 16 of the computing system 12. In some embodiments, the received data may be stored in alternative storage locations, such as the cloud.

The computing system 12 processes the received data to establish the expected activity level of the mesh network 10 covering a geographic location. In particular, the computing system 12 processes the data by searching for patterns in the data. Patterns can be found in the types, numbers, locations, and/or identities of the devices 26 in the mesh network 10. For example, the fluctuations in the number of cell phones present in the mesh network 10 may repeat every day. If five residents leave the neighborhood every weekday to go to work and take their cell phones with them, the number of cell phones in the mesh network 10 covering the neighborhood will follow a predictable pattern of decreasing by five every weekday morning. In another example, some devices 26, such as the security devices, smart speakers, and Wi-Fi routers are stationary devices. Thus, they will likely be part of the mesh network monitoring system 8 of the neighborhood for the duration of their lifetime. The computing system 12 may recognize, based on respective IP addresses and/or other identity information, the devices 26 that are typically present in the mesh network 10 of the neighborhood. Furthermore, based on the respective IP addresses and/or other identity information, unfamiliar devices 26 that are new to the mesh network 10 may be identified.

Patterns found in the data may be projected into the future to predict an expected activity level of the mesh network 10. The expected activity level may include information of the types, numbers, locations, and/or identities of 26 that are predicted to be part of the mesh network 10 at any given time. In some embodiments, the expected activity level may be a range of values of the types, numbers, locations, and/or identities of devices 26 that may be part of the mesh network 10 at a given time. For example, the expected activity level may include a range of 80 to 100 total devices 26, as well as 10 to 12 smart speakers, 5 to 8 security systems, 30 to 40 cell phones, and 30 to 40 cars among the total devices 26. In other embodiments, the ranges of values of the types, number, locations, and/or identities of devices 26 present in the mesh network 10 may include likelihood or confidence levels. Alternatively, clustering algorithms may be used to find similarities in the received data and to identify outliers. Generally, the detection of patterns and the prediction of the expected activity level may be accomplished by a variety of different computational methods, including statistical methods, neural networks, clustering algorithms, machine learning models, or a combination thereof.

The detected patterns in the activity levels of the mesh network 10 over time are used to generate the expected activity level. Then, the expected activity level can be used to identify events (e.g., unexpected events; atypical events) in the mesh network 10. During an event, the current activity level (e.g., the types, numbers, locations, and/or identities of devices 26 present in the mesh network 10 at the time of measurement) may deviate from the expected activity level.

Figure 2:
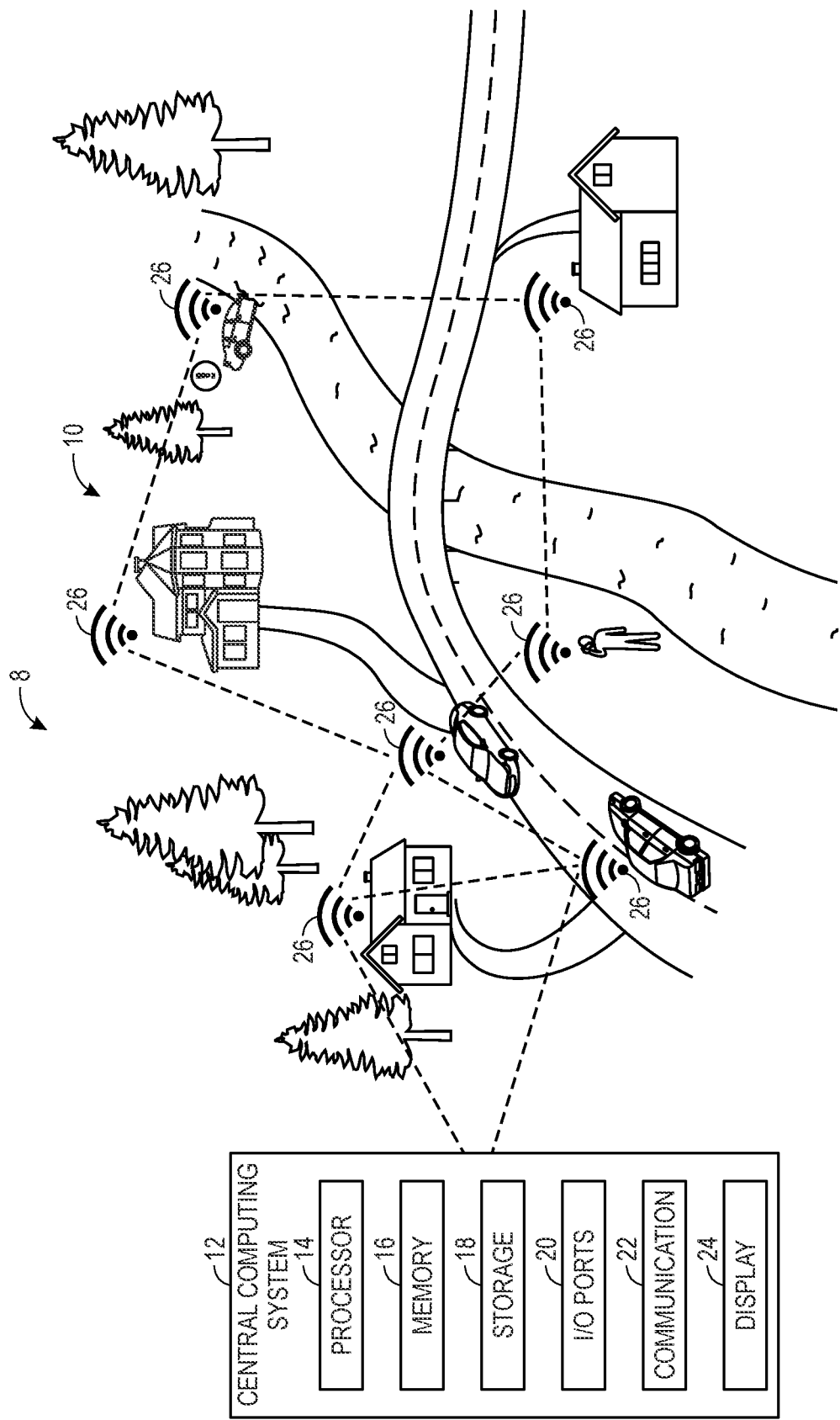
FIG. 2 illustrates the mesh network monitoring system of FIG. 1 during an event in the neighborhood, in accordance with embodiments described herein.

In the illustrated example, FIG. 1 represents the expected state (e.g., expected activity level) of the mesh network 10 of a neighborhood, while FIG. 2 represents a possible current activity level (or a current state) of the mesh network 10 of the neighborhood. In particular, FIG. 2 illustrates the mesh network monitoring system 8 of the neighborhood during an event (e.g., the car has driven off the road), in accordance with embodiments described herein. As shown in FIG. 2, in the current state, the mesh network 10 of the neighborhood contains three car infotainment systems (represented as cars), a cell phone (represented as a pedestrian), and three computer routers (represented as houses). This is similar to the expected state, shown in FIG. 1, where there are also three car infotainment systems (represented as cars), a cell phone (represented as a pedestrian), and three computer routers (represented as houses) in the neighborhood mesh network 10. However, the location of one of the cars in the current state deviates from the location of the cars in an expected state. This may be due to one of the cars having accidently run off the road, as shown in FIG. 2.

Upon comparing the current state with the expected state, the computing system 12 of the mesh network monitoring system 8 may identify the deviation in the location of the car and may classify it as an event. Following the classification, the computing system 12 may issue a notification that an event has occurred. In some embodiments, the notification may appear on the display 24 of the computing system 12. In some embodiments, the notification may be sent as a text message, phone call, or email to one or more of the users whose devices 26 are part of the mesh network 10 (e.g., via one or more of the devices 26). Additionally, the notification may be viewable via an application or a website by one or more of the users whose devices 26 are part of the mesh network 10 (e.g., via one or more of the device 26).

The computing system 12 may store and/or access maps of the neighborhood (e.g., geographical features in the neighborhood) to facilitate classifying and/or identifying events (e.g., based on its location derived from the data shared over the mesh network 10, the car is in one region that does not correspond to a road and/or that corresponds to a ditch). In some cases, the identification of the event may trigger the computing system 12 to send messages, which are displayed as pop-up text messages on one or more cell phones of the one or more users. In some cases, the identification of the event may trigger the computing system 12 to establish two-way voice communications with one of the devices 26 in the car (e.g., to allow someone outside of the car to speak with an occupant of the car via the car infotainment system and/or via a cell phone within the car). For example, the computing system 12 may direct one of the devices 26 outside of the car to call the cell phone within the car. It should be appreciated that other events may be identified via comparison of the current state and the expected state, such as events including a number of devices at one location (e.g., home or park) that exceeds an expected number of devices or is otherwise above a threshold that indicates an unauthorized party or gathering, a device following an unusual path at an unusual time (e.g., a car that has not previously been in the neighborhood is circling the neighborhood at 3:00 AM), or the like.

In some cases, the computing system 12 may have access to a list of devices that are known to be associated with crimes or other events (e.g., identifying information of a cell phone of a person suspected of committing crimes), and the computing system 12 may reference the list to identify whether one of the devices in the neighborhood matches the list. For example, upon detecting the device following the unusual path at the unusual time, the computing system 12 may reference the list and upon matching the identifying information of the device to the list may send an alert to an emergency services system (e.g., associated with a police department for the neighborhood) and/or to one or more of the devices 26. In this way, tracking a number of devices in the mesh network 10 and the activity of the devices in the mesh network 10 may efficiently trigger certain responses and actions. Furthermore, it should be appreciated that the identification of the event may trigger other actions, such as to send instructions to an autonomous vehicle (e.g., drone, car) in the mesh network 10 to travel to a location of the event to investigate the event and/or to send instructions to security systems/cameras in the mesh network 10 to capture and communicate images of the event (e.g., to communicate the images over the mesh network 10 to other devices 26 and/or the computing system 12).

Figure 3:
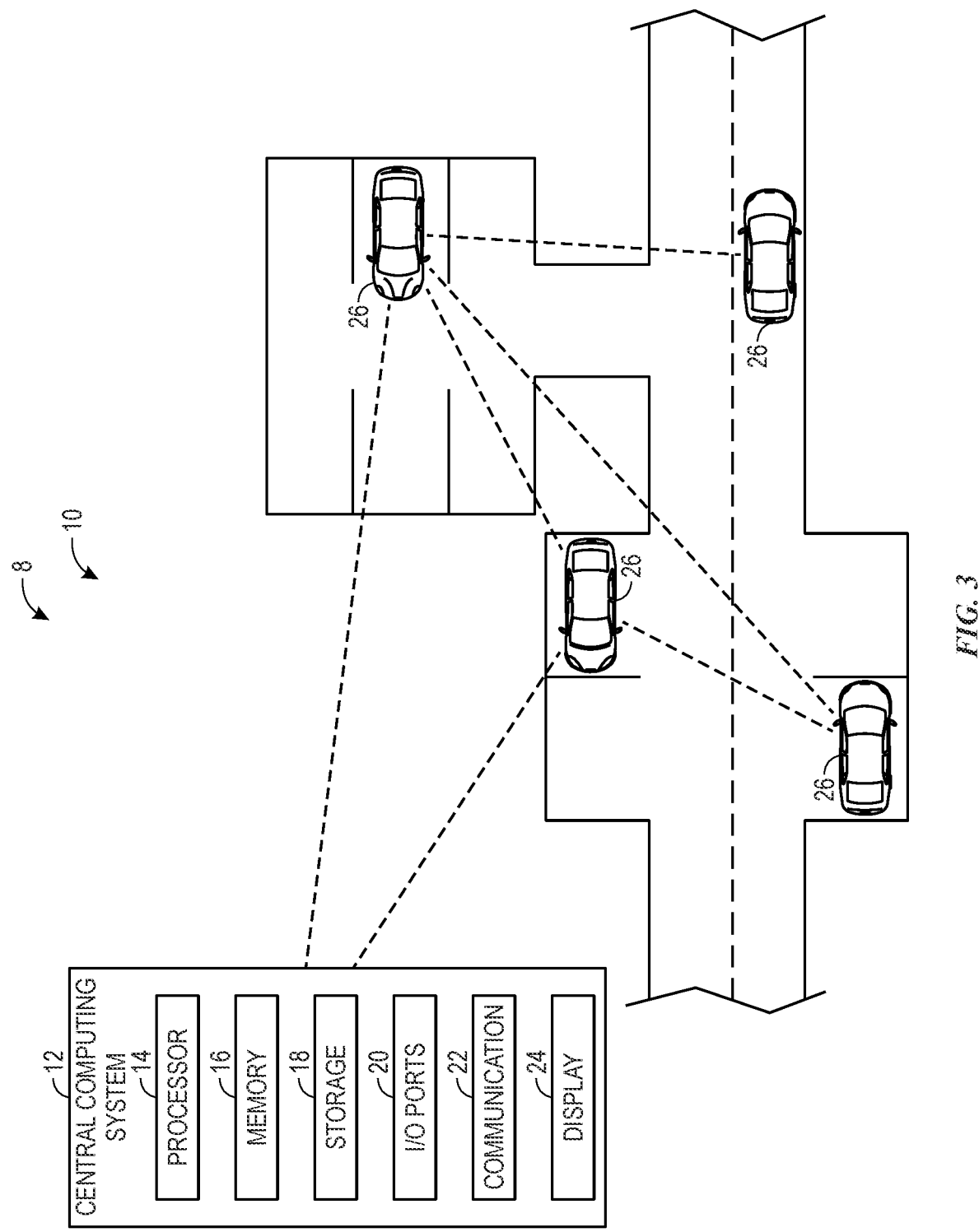
FIG. 3 illustrates a mesh network monitoring system of cars on a parking lot, in accordance with embodiments described herein.

FIG. 3 illustrates a mesh network monitoring system 8 of cars 26 (e.g., car infotainment devices) on a parking lot, in accordance with embodiments described herein. The mesh network monitoring system 8 may be used to determine the parking lot's occupancy level (e.g., how many parking spots are filled out of the total number of parking spots) and to notify drivers/self-driving cars of the available parking options. In addition, the mesh network monitoring system 8 may assess other characteristics of the parking lot, including prior incidents (e.g., accidents, break-ins) in the parking lot and/or specific location of available parking spots. As shown in FIG. 3, the mesh network 10 includes several cars 26 in a vicinity of a parking lot. Each car 26 in the mesh network 10 is connected to at least one other car 26, and at least one car 26 is connected to a computing system 12.

The computing system 12 receives data from the cars 26 that are part of the mesh network 10. In one embodiment, the computing system 12 receives GPS locations and identifying characteristics (e.g., license plate number, make and model) of the cars 26. This information is used by the processor 14 of the computing system 12 to determine the number of cars 26 in the mesh network 10. In one embodiment, the computing system 12 receives an address of the car's destination from navigation system of the car 26. If the parking lot or its vicinity is the car's destination, then the car 26 likely needs a parking spot in the parking lot. In one embodiment, if a car's navigation destination is set to an address that is further from the parking lot than a threshold distance value, the car will not receive parking information from the computing system 12, as the car is likely to be just passing by.

In some embodiments, only the cars 26 that are turned on (e.g., running) are part of the mesh network 10 as these cars have their wireless communication capabilities enabled. The cars 26 that are powered off and parked may not be part of the mesh network 10 due to having their wireless communication capabilities turned off. However, the mesh network monitoring system 8 may keep track of the cars 26 parked on the parking lot even if they are turned off. For example, if a car has stopped in a parking spot and then went offline (e.g., left the mesh network 10), then the computing system 12 may determine that the car was parked on the parking lot and store that information in memory 16 until this car rejoins the mesh network 10. Keeping track of parked cars in this way may enable the mesh network monitoring system 8 to accurately assess the occupancy of the parking lot.

In some embodiments, the computing system 12 may have external information (e.g., information not gathered by the mesh network monitoring system 8) stored in its memory 16. The external information may include a maximum occupancy number of the parking lot as well as a map of the parking lot. The maximum occupancy number may be used to determine how many unoccupied parking spots are left on the parking lot. The map of the parking lot may be used to determine where the unoccupied parking spots are located and whether the cars are properly parked (e.g., cars are parked in corresponding parking spots). For example, if the GPS location of a certain car indicates that it is parked on a white line separating two parking spots, the computing system 12 may identify this as two parking spots being occupied. If, on the other hand, a certain car is parked in a designated no park zone, the computing system 12 may identify this as no parking spots being occupied and/or notify a parking lot attendant of a violation (e.g., via a device operated by and/or accessible to the parking lot attendant).

To assist the cars 26 in the mesh network 10 in finding a parking spot, the mesh network monitoring system 8 may send information about the current state of the parking lot to the cars 26 that are part of the mesh network 10. In one embodiment, the cars 26 receive information about the number of parking spots currently available on the parking lot, which is calculated by the processor 14 of the computing system 12 based on the current occupancy count and the known maximum occupancy of the parking lot. In addition, the computing system 12 may send the car 26 the coordinates of a currently available parking spot and/or share a map of the currently available parking spots.

In addition to evaluating the current state (e.g., current occupancy level) of the parking lot, the computing system 12 may also predict an expected state (e.g., expected occupancy level) based on the patterns found in the data collected from the mesh network 10. While knowing the current state of the parking lot may be useful to those drivers (or self-driving cars) that are already part of the mesh network 10 and ready to park, knowing the expected state may be useful in informing drivers (or self-driving cars) about the availability of parking before they arrive. The expected state of the parking lot may be shared with navigation applications/technologies to provide an estimation of the parking lot occupancy at the navigation destination at the expected arrival time. In this way, the navigation applications/technologies may generate a route and/or guide the drivers (or self-driving cars) to a parking lot that is expected or predicted to have available parking spots (and not to a parking lot that is expected or predicted to have no available parking spots).

Comparing the current parking lot occupancy to the expected occupancy enables determination of deviations in the current state of the parking lot from its typical state. Deviations from the expected occupancy level may indicate a possible security risk at the parking lot. For example, if the parking lot is much less busy then usual (e.g., the parking lot has much fewer cars than expected), the cars 26 parked on the parking lot may have an increased risk of being broken into or stolen. On the other hand, if the parking lot is much busier than usual, there may be an increased risk of a car collision at the parking lot. Thus, the results of the comparison between the current occupancy level and the expected occupancy level may be taken into account when assessing state of the parking lot and may be provided directly or indirectly to the cars that are part of the mesh network 10.'

It should be appreciated that the applications of the mesh network monitoring system are not limited to monitoring of events in a neighborhood or monitoring of parking availability on a parking lot. Additional exemplary applications of the mesh network monitoring system include monitoring of traffic at an intersection and monitoring air traffic over an airport.

Figure 4:
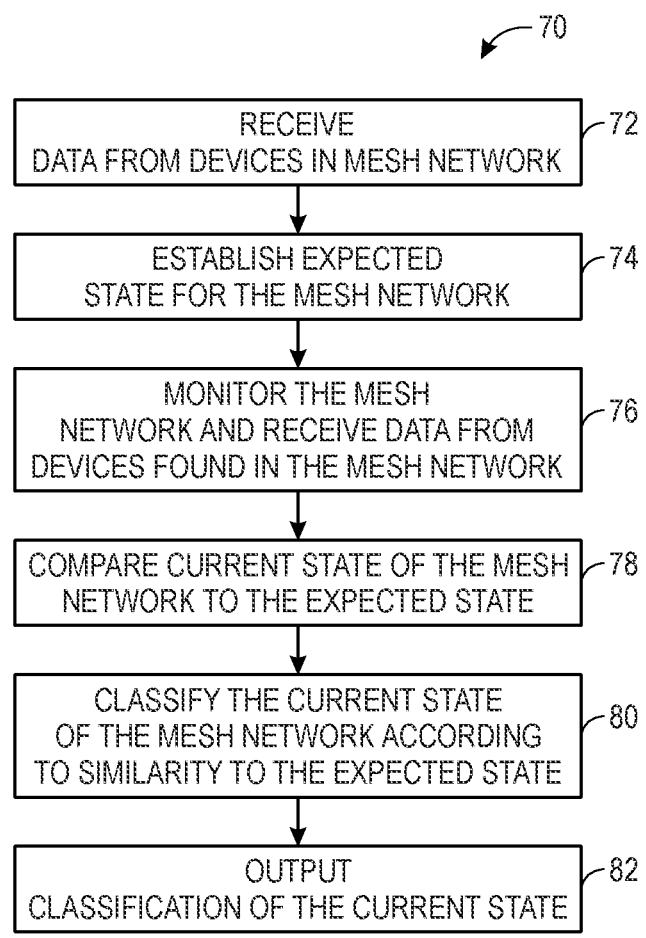
FIG. 4 is a flow chart of a process of classifying a current activity level of a geographic area connected by a mesh network, in accordance with embodiments described herein.

FIG. 4 is a flow chart of a process 70 for monitoring and classifying an activity level of a geographic area using a mesh network monitoring system 8, in accordance with embodiments described herein. The goal of the process 70 is to detect unexpected and/or atypical events and output notifications accordingly. The following description of the process 70 will be described as being performed by the computing system 12, but it should be noted that any suitable processor-based device may be specially programmed to perform any of the steps of the process 70 described herein. Moreover, although the following description of the process 70 is described in a particular order, it should be understood that the steps of the process 70 may be performed in any suitable order, certain steps of the process 70 may be omitted, and other steps may be added to the process 70.

The process 70 begins with receiving data from various devices 26 in the mesh network 10 (block 72). As mentioned, the various devices 26 in the mesh network 10 may include wireless communication-enabled devices such as smart speakers, home security devices (e.g., smart security cameras, door locks, and doorbells), cell phones, Wi-Fi routers, Wi-Fi hotspots, car infotainment systems, and/or tracker devices (e.g., tag tracker). The data received from the devices 26 in the mesh network 10 may include information about the types of devices 26 (e.g., cell phones, security cameras, car infotainment systems), the GPS location of the devices 26, and/or the identity of devices 26 (e.g., IP address, system configuration, make/brand and model) that are present in the mesh network 10.

After the data has been received, the expected activity level for the mesh network 10 is established (block 74). As mentioned, establishing the expected activity level (e.g., expected state) involves storing the collected data (e.g., in the memory 16 or a cloud) and finding patterns in the stored data. The repeating patterns may be found in the numbers, types, locations, and/or identities of devices 26 present in the mesh network 10. The patterns can be projected into the future to establish the expected activity level. Because the expected activity level follows or is based on the patterns numbers, types, locations, and/or identities of devices 26 present in the mesh network 10 over prior time periods, it represents the typical behavior expected in the mesh network 10. The expected activity level may vary over time (e.g., be different for certain times of day, days of the week, days of the year, holidays).

The monitoring of a current activity level of the mesh network 10 continues after the expected activity level has been established. The data may be continuously received from the devices 26 found in the mesh network 10 (block 76). Thus, the computing system 12 may constantly gather and search for new patterns in the data and may update the expected activity level.

The expected activity level may then be compared with the current activity level (block 78). The comparison may involve calculating a difference between the data values (e.g., numbers, types, locations, and/or identities of devices 26 present in the mesh network 10) associated with the expected activity level and the current activity level. For example, the computing system 12 may determine that a parking lot at 1:00 PM on a weekday may typically have or be expected to have 8 to 12 parked cars. However, at 1:00 PM on a current day, the computing system 12 detects a current activity level corresponding to 19 parked cars in the parking lot, which is a nine car deviation from the expected activity level. If, instead, the current activity level included ten parked cars, the current activity level would fall within and/or correspond to (e.g., match) the expected activity level. In other embodiments, other methods can be used to make the comparison. For example, Cook's distance and/or hat matrix may be used to determine if the current activity level is an outlier in the past data collected from the mesh network 10.

Next, the current activity level of the mesh network 10 is classified according to its similarity to the expected activity level (block 80). In an example involving a parking lot, if the number of cars in the current state exceeds the number of cars in the expected state, then the parking lot may be classified as busy. In another example, if a smart security camera ran out of battery and went offline, comparing the types of devices 26 found in the current activity level against the expected activity level may result in classification of the current activity level as an event having the security camera missing/offline. A comparison of the identity of devices 26 found in the current state versus the expected state may identify an event of a possible trespasser in the neighborhood. Additionally, comparing the locations of devices 26 in the current state versus the expected state may help identify other unexpected scenarios and events, such as a car that ran off the road as shown in FIG. 2.

Lastly, the classification of the current activity level is output (block 82). The classification may be sent as a notification or alert to one or more of the users whose devices 26 are part of the mesh network 10 (e.g., via the devices 26). In some embodiments, the alert may be communicated via a mobile notification, a mobile application, a web-service, text message, a phone call, and/or an email. In some embodiments, the display 24 of the computing system 12 may present the notification. In some embodiments, the devices 26 that are part of the mesh network 10 and capable of directly communicating with users (e.g., through sound or graphical user interface) may present the notification. For example, the driver whose car is part of a mesh network 10 of a parking lot may receive a notification that the parking lot is busy from their smartphone and/or the car's infotainment system. Similarly, the user of the security camera may receive an alert that the security camera went offline from their smart phone and/or smart speaker. Since the mesh network 10 is monitored continuously, after the classification of the current activity level has been output (block 82), new data from various devices 26 in the mesh network 10 is received (block 72) and the process 70 begins again.

In some embodiments, the computing system 12 may receive an input (e.g., via one of the devices 26) to register the one or more devices 26 in the mesh network 10 so that the one or more devices 26 becomes part of the expected activity level. In some embodiments, the computing system 12 may receive an input (e.g., via one of the devices 26) in response to the notification, wherein the input confirms that the event is not a cause for alarm and should not trigger the notification (e.g., a homeowner inputs via their security system on the mesh network 10 that the new cell phone detected on the mesh network 10 belongs to a new tenant). Thus, the computing system 12 may no longer output the notification after the input, may send an updated notification to confirm that there is no suspicious activity on the mesh network 10 after the input, or the like. Additionally, the computing system 12 updates the expected activity level over time, and thus, eventually certain new devices become recognized and included as part of the expected activity level (e.g., after being detected on the mesh network 10 according to some pattern or for some period of time, such as eight consecutive overnight hours, the new cell phone may become part of the expected activity level). In this way, the expected activity level changes and evolves over time to accurately predict and represent the expected activity level for the mesh network 10.

It should be understood that the expected state and/or the current activity levels may be determined solely with data received at the computing system 12 from the devices 26 in the mesh network 10 (e.g., only the data that is wirelessly communicated from the devices 26 via the mesh network 10). For example, other sources of data, such as user inputs, news data, and/or weather data, may not be considered to determine the expected activity levels and/or the current activity levels. In this way, the computing system 12 may automatically and efficiently carry out the techniques disclosed herein with limited, easy-to-access data received automatically upon the devices 26 joining and leaving the mesh network 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A mesh network monitoring system, comprising:
one or more processors; and
memory storing instructions executable by the one or more processors to cause the one or more processors to:
obtain an expected activity level associated with a mesh network in a geographical area, wherein the expected activity level comprises a respective expected number of first devices of a first device type associated with a plurality of homes in the geographical area and a respective expected number of second devices of a second device type carried by vehicles in the geographical area;
receive data from a plurality of devices via the mesh network;
determine a current activity level associated with the mesh network based on the data;
compare the current activity level to the expected activity level;
detect an event based on a difference between the current activity level and the expected activity level; and
provide an output indicative of the event.

2. The mesh network monitoring system of claim 1, wherein the instructions are executable by the one or more processors to cause the one or more processors to assign a classification to the event based on features in the geographical area, and the output is indicative of the classification.

3. The mesh network monitoring system of claim 1, wherein the plurality of devices in the mesh network comprise wireless communication-enabled devices, and wherein the wireless communication-enabled devices comprise cell phones, car infotainment systems, smart speakers, smart home assistants, smart security devices, Wi-Fi routers, trackers, or a combination thereof.

4. The mesh network monitoring system of claim 1, wherein the mesh network comprises a dynamic composition over time as additional devices join the plurality of devices, as certain devices leave the plurality of devices leave, or both.

5. The mesh network monitoring system of claim 1, wherein each of the plurality of devices in the mesh network is connected to at least one other device of the plurality of devices in the mesh network.

6. The mesh network monitoring system of claim 1, wherein the geographical area comprises a neighborhood.

7. The mesh network monitoring system of claim 1, wherein the instructions are executable by the one or more processors to cause the one or more processors to determine the expected activity level in the mesh network.

8. The mesh network monitoring system of claim 7, wherein the instructions are executable by the one or more processors to cause the one or more processors to determine the expected activity level in the mesh network via identifying patterns in prior data received from the plurality of devices via the mesh network.

9. The mesh network monitoring system of claim 1, wherein the instructions are executable by the one or more processors to cause the one or more processors to provide the output indicative of the event to at least one of the plurality of devices, wherein the output comprises an email, a text message, a mobile application notification, a phone call, or a combination thereof.

10. A method of operating a mesh network monitoring system, the method comprising:
   obtaining, using one or more processors, an expected activity level associated with a mesh network in a geographical area, wherein the expected activity level comprises a respective expected number of first devices of a first device type associated with a plurality of homes in the geographical area and a respective expected number of second devices of a second device type carried by vehicles in the geographical area;
   receiving, at the one or more processors, data from a plurality of devices via the mesh network;
   determining, using the one or more processors, a current activity level associated with the mesh network based on the data;
   comparing, using the one or more processors, the current activity level to the expected activity level;
   detecting, using the one or more processors, an event based on a difference between the current activity level and the expected activity level; and
   providing, using the one or more processors, an output indicative of the event.

11. The method of claim 10, comprising determining, using the one or more processors, the expected activity level in the mesh network via identifying patterns in prior data received from the plurality of devices via the mesh network.

12. The method of claim 10, comprising providing, using the one or more processors, the output indicative of the event to at least one of the plurality of devices.

13. The method of claim 10, wherein the expected activity level varies over time.

14. A mesh network monitoring system, comprising:
   one or more processors; and
   memory storing instructions executable by the one or more processors to cause the one or more processors to:
      receive data from a plurality of wireless communication-enabled devices via the mesh network;
      determine a current activity level associated with the mesh network based on the data, wherein the current activity level comprises a respective current number of first devices of a first device type associated with a plurality of homes in the geographical area and a respective current number of second devices of a second device type carried by vehicles in the geographical area;
      detect an event based on the current activity level; and
      provide an output indicative of the event to at least one of the plurality of wireless communication-enabled devices.

15. The mesh network monitoring system of claim 14, wherein the instructions are executable by the one or more processors to cause the one or more processors to:
   determine an expected activity level in the mesh network based on patterns in prior data received from the plurality of wireless communication-enabled devices via the mesh network;
   compare the current activity level to the expected activity level; and
   detect the event based on a difference between the current activity level and the expected activity level.

16. The mesh network monitoring system of claim 15, wherein the instructions are executable by the one or more processors to cause the one or more processors to update the expected activity level over time.

17. The mesh network monitoring system of claim 14, wherein the data is indicative of a respective location of a first device of the plurality of wireless communication-enabled devices, the current activity level associated with the mesh network comprises the respective location of the first device, and the instructions are executable by the one or more processors to cause the one or more processors to:
   obtain a map of the geographical area; and
   compare the respective location of the first device to the map of the geographical area to detect the event.

18. The mesh network monitoring system of claim 1, wherein the first device type comprises home security devices.

19. The mesh network monitoring system of claim 1, wherein the expected activity level comprises a respective expected number of third devices of a third device type worn or carried by users in the geographical area.

20. The mesh network monitoring system of claim 19, wherein the third device type comprises smartphones.

* * * * *